US009018877B2

(12) United States Patent
Braun et al.

(10) Patent No.: US 9,018,877 B2

(45) Date of Patent: Apr. 28, 2015

(54) METHOD FOR PERFORMING CLOSED-LOOP AND/OR OPEN-LOOP CONTROL OF A WINDSHIELD WIPER DEVICE, COMPUTER PROGRAM PRODUCT, CONTROL DEVICE AND WINDSHIELD WIPER DEVICE

(71) Applicant: Robert Bosch GmbH, Stuttgart (DE)

(72) Inventors: Peter Braun, Buehlertal (DE); Norbert Wegner, Buehl (DE); Juergen Rapp, Lauf (DE); Michael May, Offenburg (DE); Alexander Kuderer, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 13/719,540

(22) Filed: Dec. 19, 2012

(65) Prior Publication Data

US 2013/0162189 A1 Jun. 27, 2013

(30) Foreign Application Priority Data

Dec. 23, 2011 (DE) ........................ 10 2011 089 849

(51) Int. Cl.
*H02P 7/00* (2006.01)

(52) U.S. Cl.
CPC ........................................ *H02P 7/00* (2013.01)

(58) Field of Classification Search
CPC ........................................................ H02P 7/00
USPC ........................ 318/434, 400.15, 400.01, 700
See application file for complete search history.

(56) References Cited

U.S. PATENT DOCUMENTS

| | | | | |
|---|---|---|---|---|
| 6,281,649 | B1 * | 8/2001 | Ouellette et al. | 318/443 |
| 6,703,804 | B1 * | 3/2004 | Courdier et al. | 318/445 |
| 8,662,569 | B2 * | 3/2014 | Klop | 296/193.1 |
| 2004/0010879 | A1 | 1/2004 | Zimmer | |

FOREIGN PATENT DOCUMENTS

| | | |
|---|---|---|
| DE | 10144985 | 3/2003 |
| DE | 102008001816 | 11/2009 |
| JP | 2011218997 | 11/2011 |

* cited by examiner

*Primary Examiner* — David S Luo
(74) *Attorney, Agent, or Firm* — Michael Best & Friedrich LLP

(57) ABSTRACT

A system for determining if a tire of a vehicle is improperly inflated. The system includes a radar, a wheel speed sensor, and a controller. The radar is configured to emit a signal to detect a reflection of the signal off of an object positioned perpendicular to the vehicle, and to output an indication of a speed of the vehicle. The wheel speed sensor is configured to sense a speed of a wheel of the vehicle. The controller is configured to receive the indication of the speed of the vehicle from the radar, to calculate a speed of the vehicle based on the sensed speed of the wheel, and to determine a tire of the wheel is improperly inflated when the speed of the vehicle calculated using the wheel speed sensor varies by more than a predetermined amount from the speed of the vehicle determined using the radar signal.

16 Claims, 3 Drawing Sheets

102
32
30
104
10
M
28
106
CONTROL DEVICE
35

METHOD FOR PERFORMING CLOSED-LOOP AND/OR OPEN-LOOP CONTROL OF A WINDSHIELD WIPER DEVICE, COMPUTER PROGRAM PRODUCT, CONTROL DEVICE AND WINDSHIELD WIPER DEVICE

BACKGROUND OF THE INVENTION

The invention relates to a method for operating a wiper drive having a motor, a computer program product with program code which is stored on a non-transient machine-readable carrier, and a control device for a wiper drive. In particular, the invention relates here to the load-dependency of the motor torque during wiping. Embodiments of the invention also relate to a windshield wiper device and to a method for performing closed-loop and/or open-loop control of a windshield wiper device, in particular for a motor vehicle having an electronically actuated wiper drive motor.

Numerous methods for controlling wiper drives (WSAs) are known. For example, DE 101 44 985 describes a drive which drives a wiper via a wiper shaft and a torque which is dependent on the position of the gear mechanism. In this context, a controller is used in such a way that the torque which is output by a motor is determined at every point in time by taking into account the transmission ratio. In these methods, the wiper motor is actuated in each case in such a way that the position of the wiper blade on the windshield always moves on a setpoint trajectory. In other methods, in the critical regions of the windshield wiper device the wiper motor is reduced in terms of the maximum torque which it can output by reducing the voltage supply via an actuator unit. In windshield wiper devices with direct drive of the wiper levers via the drive motor without an intermediately connected linkage, the drive is powered down when a maximum permissible torque for the permanent operation of the gear mechanism is reached, in order to protect the gear mechanism.

In wiper drives (WSAs), the components are loaded during operation by forces. In this context, in the case of wiper drives such as are used, for example, in motor vehicles for windshield wipers, these forces increase, in particular in the case of snow load, wind load or in the case of blocking of the wiper. In particular, very large loads can occur in the latter case of blocking, in particular in the case of rigid systems.

Typically, in wiper systems with direct wiper drives, drives are used with reversing electric motors in which the motor for generating the to and fro movement of the wiper changes the rotational direction. In this context, the wiper blade changes the direction of movement in a lower or upper turning position. The use of such reversing motors also permits an extended parked position (EPS).

A limited voltage and therefore a limited motor torque for limiting the load can be fed by pulse width modulation (PWM) to an electric motor contained in a wiper drive, as a protective function against damage or destruction. Limiting here serves to protect against damage and to promote compliance with specifications in order to ensure the service life of the components. However, there are operating modes in which limiting brings about blocking of the wiper system, which at least restricts the comfort from the point of view of a vehicle driver.

SUMMARY OF THE INVENTION

The object of the invention comprises at least partially solving the abovementioned problems and/or making available improved torque control.

According to one embodiment, a method for operating a direct wiper drive having a motor for a wiper device is made available. The method includes making available a limiting load torque for normal operation, determining at least a first characteristic variable for the plausibility of an exceptional case, determining at least a second characteristic variable for the reliability of an exceptional case, and deactivating the limiting load torque as a function of the first characteristic variable and the second characteristic variable.

According to a further embodiment, a computer program product with program code which is stored on a non-transient machine-readable carrier is made available. The computer program product is designed to carry out one of the method embodiments of the invention described herein, when the program is run on a computer or a control device of a vehicle.

According to a still further embodiment, a control device for a wiper drive is made available, which control device is programmed for use in a method according to embodiments described herein.

According to a still further embodiment, a windshield wiper device is made available. The windshield wiper device contains a control device according to one of the embodiments described herein and/or a computer program product according to one of the embodiments described herein; and a direct wiper drive having the motor, a wiper arm and a wiper blade.

The embodiments described here according to the present invention can avoid blocking of a windshield wiper device in many cases without adversely affecting the system service life to a relevant degree.

Embodiments of the invention make available for this purpose a method for operating a direct wiper drive having a motor for a wiper device. The methods includes making available a limiting load torque for normal operation, determining at least a first characteristic variable for the plausibility of an exceptional case, determining at least a second characteristic variable for the reliability of an exceptional case, and deactivating the limiting load torque as a function of the first characteristic variable and the second characteristic variable. A deviation from normal operation can therefore take place, which deviation can be selectively set after checking of the plausibility for the exceptional case and determining at least one further variable for the possibility of using the exception, for example at least one load spectrum. As a result, improved comfort can be achieved without adversely affecting the system service life to a relevant degree. Embodiments of the invention can therefore selectively make available a boost function for a wiper system.

According to a further typical embodiment, the deactivation can also include making available a further limiting load torque, wherein the further limiting load torque is greater than the limiting load torque, in particular is at least 50% greater than the limiting load torque. As a result, an exceptional case can be selectively generated, wherein the damage limit of one or more components of a wiper device can be taken into account as a further peripheral condition. A higher or lower selection for the value of the further limiting load torque can be made in order to obtain the desired effectiveness from the respective application.

According to a further typical embodiment, the first characteristic variable can comprise at least one characteristic variable which is selected from the group comprising: an ambient temperature and blocking of the wiper device. By selecting the ambient temperature, the blocking or both characteristic variables in order to check the plausibility, it is possible to ensure that there is sufficiently high probability that the exceptional case will be used only for the necessary case, such as for example a buildup of snow on a windshield.

According to a further typical embodiment, the characteristic variable of the ambient temperature can have an upper limit for the plausibility of an exceptional case from −10° C. to 5° C., such as for example 4° C. For temperatures up to this upper limit, it is plausible that a buildup of snow has occurred. For temperatures above the upper limit for the ambient temperature, an exception which possibly cannot be overcome appears to be present. A "boost", which could possibly lead to damage to the windshield wiper device, is therefore not used above the limit. Other upper limits or limits can be obtained from the derivation of the peripheral conditions in the climatic zones which occur throughout the world.

According to a further typical embodiment, the second characteristic variable can comprise at least one characteristic variable which from the group comprising: a first number of already existing exceptional cases in a limited time period and a second number of already existing exceptional cases in the life cycle of at least one component of the wiper device. The number of exceptional cases in a limited time period makes it possible to limit the number of trials for clearing a buildup of snow on a windshield. As a result, damage to the windshield wiper device can be prevented. The number of exceptional cases in the life cycle of a component, such as, for example, of the motor or the transmission, permits limitation to an entire load spectrum over the service life of the component. This makes it possible to ensure that a boost function occurs in the life cycle of the component only with such a frequency that the system service life is not adversely affected to a relevant degree. For example, the first number can be an upper limit for the reliability of an exceptional case in a time period of several minutes from 1 to 15 or be from 5 to 15. The second number which relates to the service life of components can have an upper limit for the reliability of an exceptional case from 1000 to 15 000. The first number can have an upper limit for the reliability of an exceptional case of 1 or more, and/or the characteristic variable of the second number can have an upper limit for the reliability of an exceptional case of 1000 or more. Depending on the peripheral conditions in the climatic zones which occur throughout the world, it is also possible to define values below 1000 activations for sufficient availability for applications.

According to a further typical embodiment, the deactivation can be limited to a predetermined exceptional time period, in particular be limited to an exceptional time period of 5 s or less. As a result, the probability of damage or of an adverse effect on the service life can also be kept within limits.

According to a further embodiment, a control device and/or a computer program product with program code which is stored on a machine-readable carrier is made available. The method includes, when the program is run on a computer or a control device of a vehicle, making available a limiting load torque for normal operation, determining at least a first characteristic variable for the plausibility of an exceptional case, determining at least a second characteristic variable for the reliability of an exceptional case, and deactivating the limiting load torque as a function of the first characteristic variable and the second characteristic variable. As a result, the methods according to embodiments of the description can be used in windshield wiper devices.

In addition, embodiments are directed to a windshield wiper device having a control device according to or a computer program product embodiments of the invention and having a direct wiper drive having a motor, a wiper arm and a wiper blade.

BRIEF DESCRIPTION OF THE DRAWINGS

Exemplary embodiments of the invention are illustrated in the figures and will be described in more detail below. In the figures.

DETAILED DESCRIPTION

Figure 1:
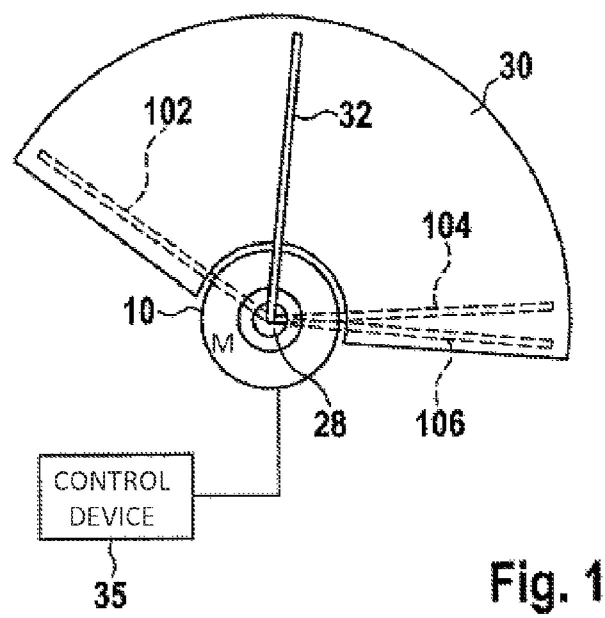
FIG. 1 shows a schematic illustration of a wiper drive, of a windshield wiper, of the control and monitoring elements as well as of the wiper positions which are typical for operation.

FIG. 1 shows a schematic illustration of a design of a wiper drive. A motor 10 brings about a rotational movement of the wiper lever 32 at the bearing 28. FIG. 1 shows the wiper lever 32 in a random position on the windshield 30. The upper turning position 102, the lower turning position 104 and the extended parked position 106 are illustrated by the dashed lines. By reversing rotation of the motor 10, during normal operation the wiper lever 32 is moved to and fro between the upper turning position 102 and the lower turning position 104. If the wiper is not required or not used during operation of the motor vehicle, that is to say if a user switches off the wiper drive, the wiper lever 32 moves from the lower turning position 104 into the extended parked position 106. The extended parked position 106 is typically located at a very low position on the windshield, for example entirely or partially in the wind shadow of a corresponding protrusion of a radiator hood of a motor vehicle.

As is illustrated in FIG. 1, the motor is typically controlled by a control device 35 and the motor detects its position, for example a rotation about the axis 28, by means of a sensor such as, for example, a magnetic sensor.

Figure 2:
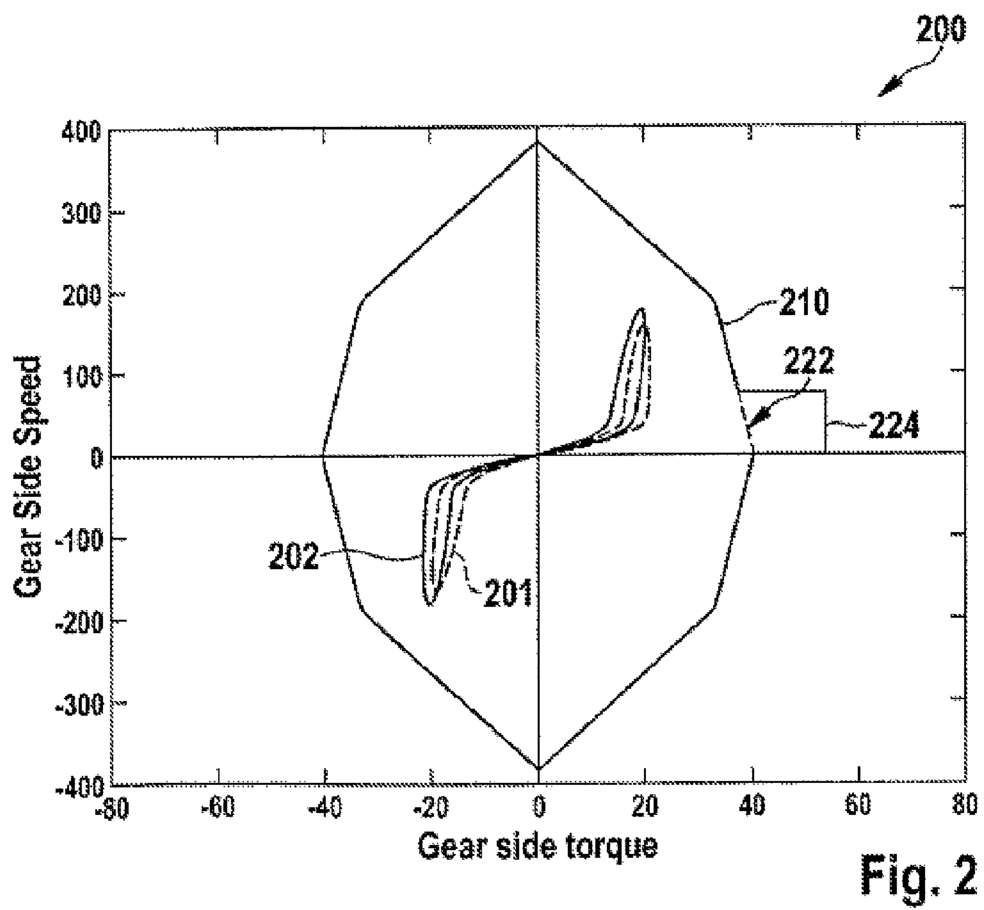
FIG. 2 shows a schematic illustration of a trajectory profile for a wiper arm on a driver's side and a front seat passenger's side, having a limiting function and the exception to this for a boost according to embodiments of the present invention.

The control device 35 controls the motor 10 in such a way that it follows a predefined trajectory. The curves 201 and 202 of the graph 200 in FIG. 2 show two typical trajectory profiles for a windshield wiper device. In this context, curve 201 shows the profile for the driver's side and curve 202 shows the profile for the front seat passenger's side. The trajectory profile is represented for a reversing cycle of a drive motor for a wiping cycle of the wiper lever on the windshield. The necessary rotational speed and the torque which the drive makes available in order to follow the setpoint trajectory are shown. The lines in the four quadrants show the available limiting rotational speed and the limiting torque for the normal operation of the wiper device.

If, for example, a buildup of snow is then lying on the windshield, the windshield wiper device can become blocked within the limiting torque. This region 222 of the profile is illustrated by dashed lines in FIG. 2. The blocking as a result of, for example, a buildup of snow on the windshield leads to a situation in which the windshield has to be cleared manually. This does not provide a good level of comfort.

According to embodiments of the invention, after the checking of the plausibility of the need to use the system, in contrast to that for the normal operation for wiping, for example on a wet or dry windshield, for a limited time period a relatively high load limit, for example a relatively high torque limit, is made available. This is illustrated in FIG. 2 by the region 224. For example, in this region the motor can be actuated with an increased PWM over a freely programmable period. With this method, an increased torque is output to the wiper lever/levers. As a result, a buildup of snow which has accumulated on the windshield over a relatively long period of time without the wiper device operating can be removed from the driver's field of vision. This function is activated only over a defined period of time and is compared with the permissible load spectra. This function therefore constitutes, inter alia, a comfort function which can make it possible to postpone the clearing away of a buildup of snow on the windshield manually until there are greater thicknesses of snow.

According to other embodiments which can be combined with the embodiments described here, the load limit or torque limit in the region 222 can also be briefly entirely deactivated. As a result, in FIG. 2 the region 222 would not be replaced by the region 224 but instead be dispensed with.

Limiting the probability of damage to components and/or the probability of a reduction in the service life occurs, inter alia, by means of plausibility checking of the use of the boost function, that is to say of the exceptional case. For this purpose, a characteristic variable for the plausibility of the exceptional case is recorded. According to one typical embodiment, the characteristic variable can be the ambient temperature, the temperature of the motor and/or of the transmission, the detection of blocking, or a combination of two or more of these characteristic variables.

For example, the ambient temperature can be assigned an upper limit for the plausibility of an exceptional case from −10° C. to 5° C., such as for example 4° C. For temperatures up to this upper limit, it is plausible that a buildup of snow has occurred. For temperatures above the upper limit for the ambient temperature, an exception which possibly cannot be remedied appears to have occurred. A "boost", which could possibly lead to damage to the windshield wiper device, is therefore not used above the limit. According to further modifications, a lower limit for the external temperature can also be introduced for plausibility checking since below specific temperatures freezing solid on the windshield can occur and therefore making favorable use of the boost function is impossible, and the plausibility checking for the exceptional case fails. Further possibilities for the characteristic variable for the plausibility of an exceptional case can also be weather data transmitted to the vehicle.

The probability of damage to components and/or the probability of a reduction in the service life are also limited by a second characteristic variable for the reliability of an exceptional case. As a result, the boost function can be limited in terms of its use by one or more load spectra.

For example, the number of boosts for the entire life cycle of the wiper device can be limited to a maximum. Typically, such a limitation is restricted to critical components of the wiper device. For example, by means of a counting process it is possible to determine how many boosts a motor, a transmission and/or a wiper arm have already made since they were put into service. For a predetermined number of boosts which exceed the limits of use of the drive in the respective application, the boost function is then no longer made available for reasons of operational safety. In this case of limitation by the life cycle, the lack of reliability is communicated to the driver of the vehicle or a vehicle technician or service technician by a suitable measure in order, if appropriate, to be able to replace a component, with the result that with the replacement of the corresponding component this functionality can be made available again.

Additionally or alternatively, the number of boosts for a buildup of snow can be limited to a maximum. For example, by means of a counting process it is possible to determine how many boosts have already been made since the last positively evaluated plausibility check. For a number of more than, for example, 5 boosts (depending on the application, this value can vary upward or downward), the reliability, the effectiveness and/or the reliability can be negated. In this case of limitation, the driver of the vehicle has to be informed that he should clean the windshield or clear away the obstacle before the journey can be started.

Figure 3A:
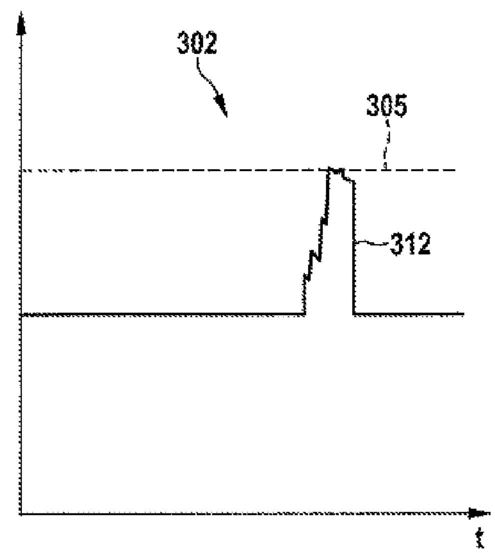
FIGS. 3A and 3B show schematic illustrations of a profile of a torque for a wiper drive without use and with use of embodiments of the present invention.
Figure 3B:
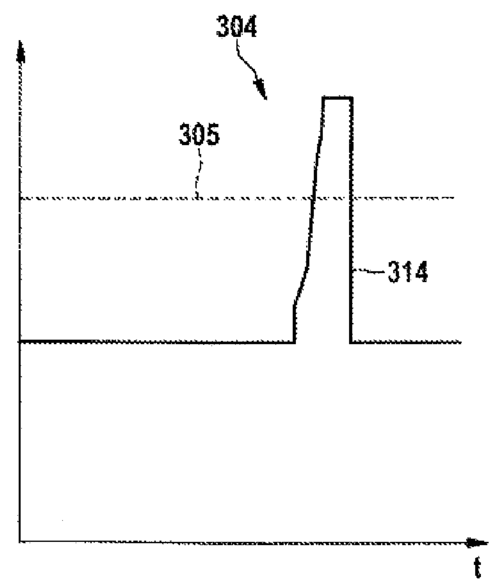

FIGS. 3A and 3B show the operation without and with the boost function according to embodiments of the present invention. Graph 302 shows a detail of a torque curve 312 plotted against the time for a normal function. According to embodiments of the invention, a load limit 305 is defined which, as shown in curve 312, limit the load or the torque. Curve 312 exceeds the limit 305 only to the degree conditioned by the control algorithm. Graph 304 shows a detail of a torque curve 314 plotted against the time for operation according to embodiments of the invention in which the limit 305 has been temporarily deactivated and therefore a relatively high load limit or torque limit is used after plausibility checking and after reliability checking The deactivation can be limited to a predetermined exceptional time period. For example, this period of time can be an upper limit of 5 s or less. Depending on the application, this upper limit can also be more than 5 s.

For the cases of complete elimination of a limit, i.e. the case without an increased limit, a further plausibility check and/or reliability check can also take place. According to some embodiments, it is thus possible to define one or more exceptional cases, wherein these can have a common check or separate checks for plausibility and reliability.

Figure 4:
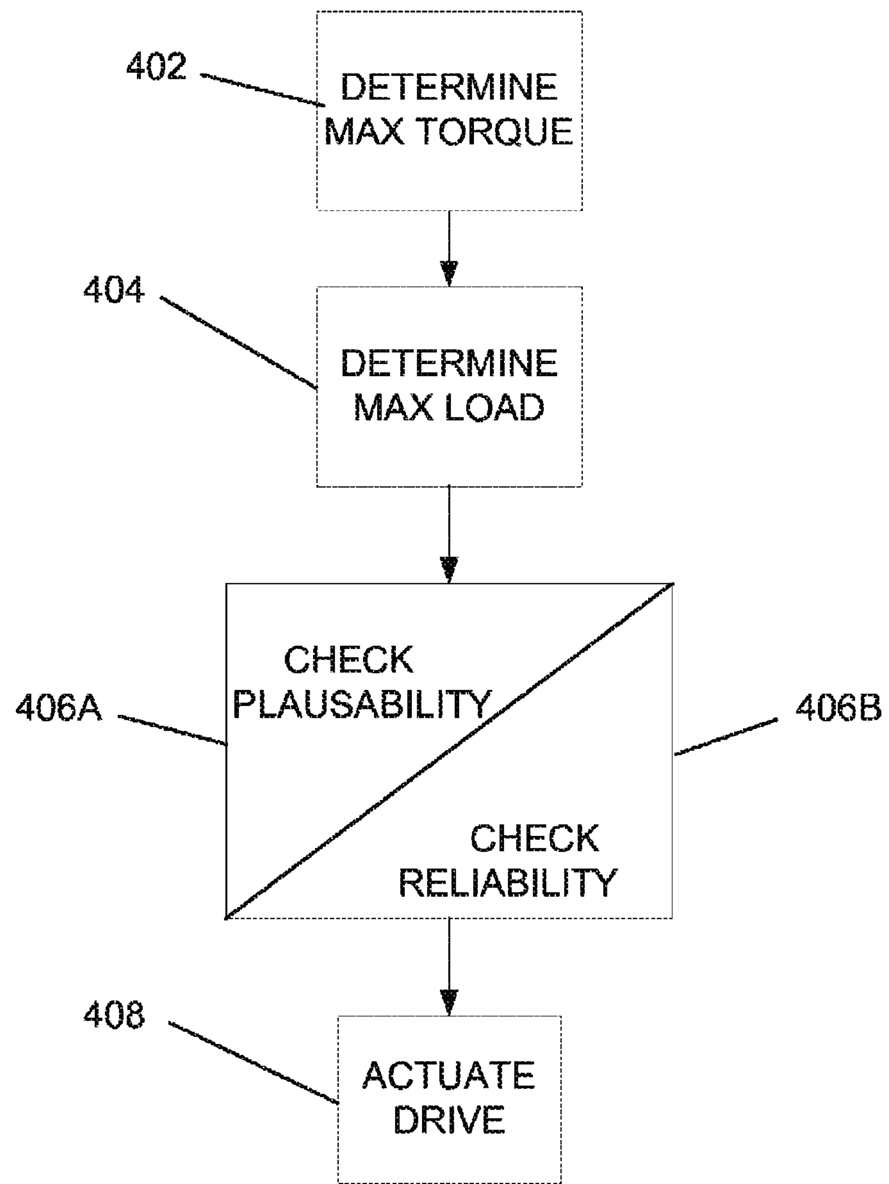
FIG. 4 shows a flowchart of a method for operating a wiper drive according to embodiments of the present invention.

According to further embodiments, in a first step 402, see FIG. 4, the drive and/or the drive motor can be characterized in such a way that the maximum tolerable torques are determined. For example, this may be determined, for example, as a function of the temperature and as a function of the load spectra which can be tolerated over the necessary service life. In a step 404, the maximum loads which are permissible for the normal operation are defined. For example, it is possible to define on the transmission side a maximum torque from 30 Nm to 50 Nm, for example approximately 40 Nm. In this context it is possible to take into account the fact that drive motors for windshield wiper devices normally exhibit a pronounced temperature behavior plotted against the temperature of the step-down transmission.

The function described below (see step 408 below) is used only if the plausibility of the permissible ambient state for the use of the function has been checked and found to be reliable. For this purpose, in step 406*a* a plausibility check for an exceptional case is carried out, and in step 406*b* a reliability check for an exceptional case is carried out. According to one embodiment, the plausibility can be given by the ambient temperature and the presence of an operating state such as, for example, blocking of the wiper device. In addition, the reliability for the exception is determined over one or more load spectra. With this procedure it is possible to ensure that this function is used only if an actual requirement is present and therefore the system service life is not adversely affected.

In step 408 the actuation of the wiper drive by means of the limiting value for the normal operation is postponed for a specific period of time or deactivated. For example, a torque of 55 Nm to 75 Nm, for example 60 Nm, can be permitted here. Furthermore, the permissible wiper speed in this operating state can be changed to a state which is appropriate for demand and which does not correspond to the normal wiping mode of operation. For example, the wiper speed can be reduced or increased according to the application on a specific vehicle. As a result, the available torque within the scope of the tolerable torque (see step 402) for this operating case is increased, as illustrated in FIG. 3B. According to typical embodiments, such control or such a method can be integrated into software and/or a control device.

According to embodiments of the invention, blocking of, for example, direct wiper drives is, where necessary, postponed until there is a larger buildup of snow. The necessary increased torques for eliminating snow barriers can be limited only to the specified required case and to the tolerable load spectra. The limit of use of existing drive motors can be postponed until an increased buildup of snow is to be eliminated and/or the deployment of material and therefore the weight of the windshield wiper device can be reduced since it is possible to meet customer requirements with a smaller design of the wiper motor, which requirements would make a larger design of a drive motor necessary if not for this functionality. In addition, the possibility of independently shaping the wiping performance, for example during operation in the winter, without influencing the wiping performance under other operating conditions is provided.

The invention claimed is:

1. A method for operating a direct wiper drive having a motor (10) for a wiper device, comprising:

using a maximum load torque limit for normal operation;

determining at least a first characteristic variable for the plausibility of an exceptional case;

determining at least a second characteristic variable for the reliability of an exceptional case; and ignoring, by a control device, the maximum load torque limit based on the first characteristic variable and the second characteristic variable.

2. The method according to claim 1, wherein the deactivation also comprises:

making available a further limiting load torque, wherein the further limiting load torque is greater than the limiting load torque.

3. The method according to claim 2, wherein the further limiting load torque is at least 30% greater than the limiting load torque.

4. The method according to claim 1, wherein the first characteristic variable comprises at least one characteristic variable which is an ambient temperature.

5. The method according to claim 4, wherein the characteristic variable of the ambient temperature has an upper limit for the plausibility of an exceptional case from −10° C. to 5° C.

6. The method according to claim 1, wherein the first characteristic variable comprises at least one characteristic variable which is a blocking of the wiper device.

7. The method according to claim 1, wherein the second characteristic variable comprises at least one characteristic variable which from the group comprising: a first number of already existing exceptional cases in a limited time period and a second number of already existing exceptional cases in the life cycle of at least one component of the wiper device.

8. The method according to claim 7, wherein the second characteristic variable first number has an upper limit for the reliability of an exceptional case from 5 to 15, and the second characteristic variable second number has an upper limit for the reliability of an exceptional case from 1000 to 60,000.

9. The method according to claim 7, wherein the second characteristic variable first number has an upper limit for the reliability of an exceptional case from 5 to 15.

10. The method according to claim 7, wherein the second characteristic second number has an upper limit for the reliability of an exceptional case from 1000 to 60,000.

11. The method according to claim 7, wherein the at least one component is the motor and/or a transmission of the wiper device.

12. The method according to claim 1, wherein the deactivation is limited to a predetermined exceptional time period.

13. The method according to claim 12, wherein the predetermined exceptional time period is limited to a period of 5 seconds or less.

14. A computer program product with program code which is stored on a non-transient machine-readable carrier, for carrying out the method according to claim 1, when the program is run on a computer or a control device of a vehicle.

15. Control device (35) for a direct wiper drive which is programmed for use in a method according to claim 1.

16. Windshield wiper device, comprising:

a control device for a direct wiper drive which is programmed for use in a method according to claim 1 and/or a computer program product with program code which is stored on a non-transient machine-readable carrier, for carrying out the method according to claim 1, when the program is run on a computer or a control device of a vehicle; and a direct wiper drive having the motor, a wiper arm and a wiper blade.

* * * * *